June 25, 1963 H. BIEBER ET AL 3,095,368
PROCESS FOR REMOVING METALLIC CONTAMINANTS FROM OILS
Filed July 31, 1957
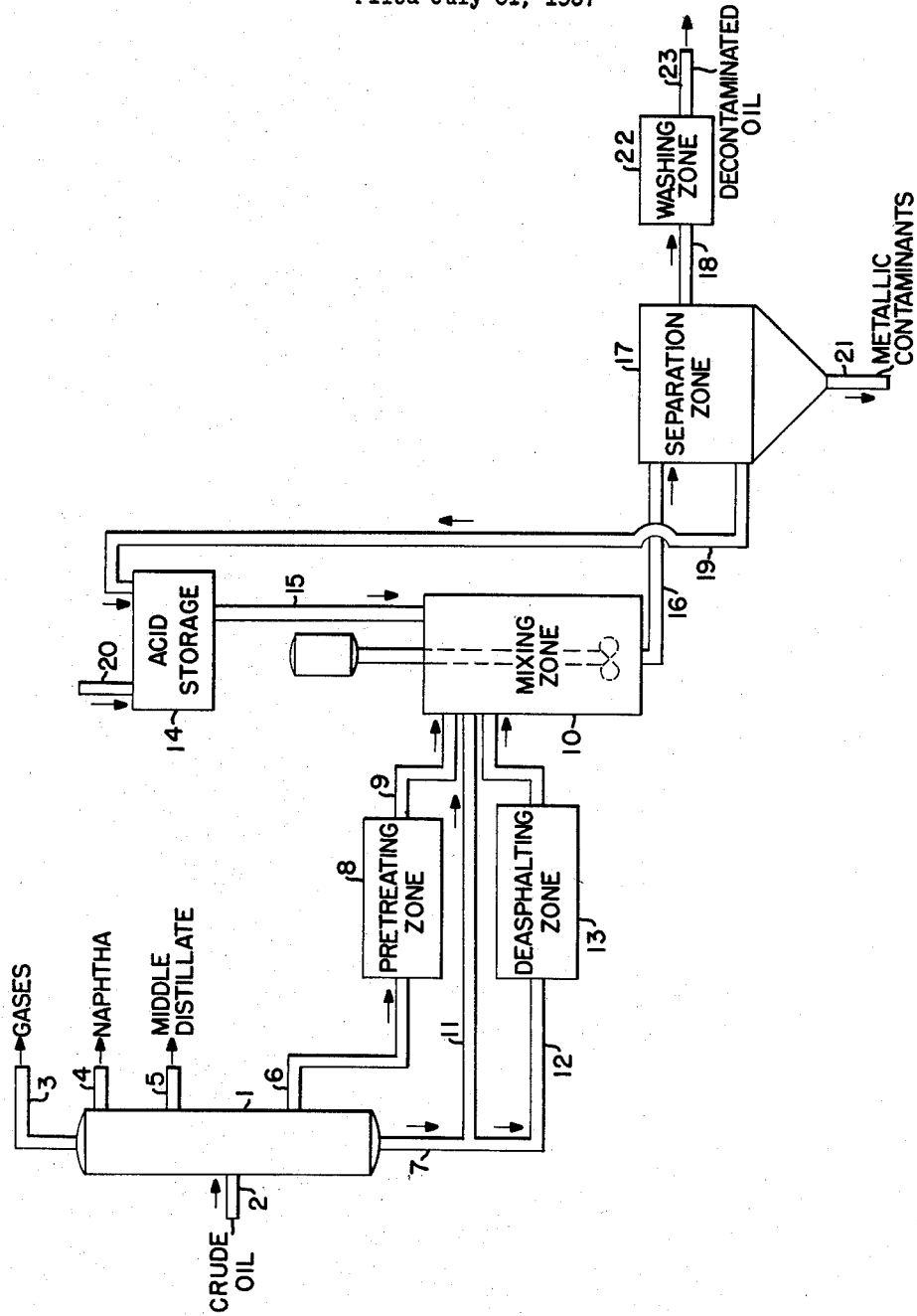
Herman Bieber
Harry M. Hartzband  Inventors
Walter M. Basch
By *Richard W. Nagel* Attorney

United States Patent Office 3,095,368
Patented June 25, 1963

3,095,368
PROCESS FOR REMOVING METALLIC CONTAMINANTS FROM OILS
Herman Bieber, Rahway, Harry M. Hartzband, Westfield, and Walter M. Basch, Rumson, N.J., assignors to Esso Research and Engineering Company, a corporation of Delaware
Filed July 31, 1957, Ser. No. 675,421
4 Claims. (Cl. 208—252)

The present invention relates to the upgrading of hydrocarbon oils and more particularly relates to an improved process for removing metallic contaminants from high boiling petroleum fractions.

The adverse effects of iron, nickel, vanadium and other metallic contaminants found in petroleum fractions boiling above 950° F. upon catalysts employed in petroleum processing operations and upon combustion equipment in which such high boiling fractions are used as fuels have long been recognized. In catalytic cracking operations, for example, very small concentrations of such contaminants in the feed to the cracking unit lead to the rapid poisoning of the catalyst, causing a significant decrease in the yield of cracked products, an increase in the production of coke and gases, and a marked shortening of the catalyst life. Metallic contaminants present in residual fuels have similarly deleterious effects in that they attack the refractories used to line boilers and combustion chambers; cause slagging and deposits on boiler tubes, combustion chamber walls and blades of gas turbines; and severely corrode high temperature metallic surfaces with which they come in contact.

Much research has been devoted to the problem of developing methods for removing metallic contaminants from high boiling petroleum fractions in order to overcome these difficulties. Heretofore, no wholly satisfactory method for accomplishing this had been found. The contaminants are largely unaffected by conventional desalting techniques, solvent extraction, chemical treatment, and other methods proposed in the past. It has therefore generally been necessary to limit the feed stocks to catalytic cracking units and other catalytic processes to those fractions which boil below the range in which metallic contaminants are found and to avoid as much as possible the use in residual fuels of high boiling residual fractions containing high contaminant concentrations.

The present invention provides a new and improved method for removing metallic contaminants from high boiling petroleum fractions which is highly effective, results in improved yields of decontaminated oil, and is economically attractive. In accordance with the invention, the contaminants in the oil are coagulated by treating the contaminated fraction with a dilute mineral acid, preferably dilute hydrochloric acid, under controlled conditions and are thereafter segregated from the oil by settling, filtration, centrifugation, or the like. The dilute mineral acid acts as a selective coagulating agent toward the contaminants and does not react chemically with other constituents of the oil to form an acid sludge. The acid in the present process may be used repeatedly and, since little or no oil is consumed in reactions with the acid, the product yields are high. The process of the invention is applicable to the treatment of high boiling gas oils, residual fractions, and crude oils.

The process of the invention is based upon studies made of the nature and properties of the metallic contaminants found in heavy gas oils and in residual fractions boiling in excess of 950° F. It has been found that such contaminants are innate constituents of the oil and are usually complex organic chelate compounds of the prophyrin type. Two forms of the contaminants have been observed, one volatile at temperatures between about 1050° and 1250° F. and the other substantially nonvolatile at such temperatures. It is believed that the volatile contaminants are single monomeric porphyrins and that the nonvolatile compounds are formed by the polymerization of two or more such porphyrins.

The nonvolatile contaminants are of low solubility in the oil and are normally colloidally dispersed therein. The volatile contaminants, on the other hand, are in true solution. Because of entrainment during fractionation of the oil, both volatile and nonvolatile contaminants may be present in distillate petroleum fractions boiling as low as 950° F. or in some instances even slightly lower. It is the colloidally-dispersed, nonvolatile contaminants which are coagulated by treatment with dilute mineral acids. The exact mechanism of the coagulation is not fully understood, but it is believed that the colloidal metals are stabilized in the oil primarily by solvation rather than by electrical charges. The dilute mineral acids apparently destroy the solvating films surrounding the colloidal metals and then act as electrolytes to effect their coagulation. Regardless of the mechanism, however, it is apparent that the phenomenon is not merely one of sludging due to chemical reaction between the dilute acids and the oil.

Since both distillate fractions and residua may contain volatile as well as nonvolatile contaminants, a preliminary treatment for the conversion of the volatile compounds into coagulable, nonvolatile compounds may therefore be employed in conjunction with the process of the invention to effect complete metals removal. Such conversion may be readily accomplished by heat soaking the fraction at elevated temperatures or by a mild hydrotreating step. Following such a preliminary treatment, substantially all the metals in the oil exist in a nonvolatile form and may be readily coagulated by treatment with dilute mineral acid. Such a preliminary treatment is, of course, unnecessary in the case of very high boiling residual fractions and other oils which essentially contain only nonvolatile contaminants.

The concentration of metallic contaminants and the ratio of volatile to nonvolatile compounds in crude oils vary considerably. The metals content of any distillate fraction will therefore depend upon the type and concentration of contaminants in the crude oil from which the fraction was distilled, the boiling range of the fraction, and the amount of entrainment which took place during the distillation. Heavy gas oils distilled from typical crudes may contain from about 1 to about 20 pounds of metallic contaminants per 1000 barrels. Residual fractions and gas oils derived from crudes which are particularly high in contaminants may contain as much as 200 pounds of metal per 1000 barrels.

Treatment with dilute mineral acids in accordance with the present invention is most effective for the coagulation of nonvolatile contaminants from nonasphaltic fractions. The asphaltenes present in highly asphaltic fractions exert a solutizing effect upon the metallic contaminants and tend to prevent their coagulation. The process of the invention may therefore be employed in conjunction with a deasphalting step when asphaltic residua are to be treated. It has particularly been found that the deasphalting of such residua and the recombining of the asphaltenes and the deasphalted oil permits the removal of metallic contaminants in accordance with the invention without the high yield losses which otherwise would be incurred.

The mineral in the dilute acid solution which is employed as a coagulating agent for the removal of metallic contaminants in accordance with the invention must be appreciably soluble in the oil and must not react chemically with the oil to form a sludge. Dilute hydrochloric acid ranging in concentration from about 3% to about 37%, depending upon the nature of the particular petroleum fraction to be treated, is the preferred coagulant. Hydrochloric acid concentrations above about 37% cause the formation of a sludge, resulting in a major reduction in the yield of treated oil, and are therefore unsuitable for use in the process. When treating asphaltic oils, the hydrochloric acid concentration must be kept at an even lower level, below about 18%, in order to prevent chemical reactions from taking place. Another dilute mineral acid which may be employed in the process is dilute nitric acid. As with hydrochloric acid, the concentration of nitric acid should be kept low enough to avoid sludge formation due to chemical reactions between the acid and oil.

The treating temperature, the volume of aqueous acid employed, the intensity with which the oil and the acid are mixed in carrying out the process of the invention may be varied considerably. It is preferred to treat at temperatures between about 70° F. and about 200° F., although in some cases temperatures as high as 500° F. may be employed. Intensive agitation of the oil and acid is preferably avoided in order that the formation of emulsions between the oil and acid may be kept to a minimum. The tendency toward emulsion formation is somewhat greater with the more highly concentrated acids. The volume of acid employed may range between about 50% and about 300% of the volume of oil treated.

The exact nature and objects of the invention may be more fully understood from the following description and the attached drawing which illustrates a preferred embodiment of the invention.

Referring now to the drawing, reference numeral 1 designates a crude oil distillation zone which may constitute, for example, an atmospheric pipe still or a combination of atmospheric and vacuum distillation towers. Crude oil may be introduced into distillation zone 1 through line 2 and separated in a variety of fractions having different boiling ranges. Light hydrocarbon gases in the $C_1$ to $C_4$ range, such as methane, ethane, ethylene, propane and the like, may be taken off through an overhead line 3. Naphtha may be withdrawn from the distillation zone through an upper side stream withdrawal line such as line 4 and middle distillates such as kerosene and light gas oil may be withdrawn through other lines such as line 5. These middle distillate fractions may boil up to about 900° F. and will be substantially free of metallic contaminants. A heavy gas oil fraction boiling in the range between about 950° F. and about 1300° F. is withdrawn from the lower portion of the distillation zone through line 6. The residual fraction boiling above the heavy gas oil is taken off as a bottoms product through line 7. Both of these two latter streams will contain substantial quantities of metallic contaminants.

As mentioned above and as will be explained in greater detail hereafter, the heavy gas oil withdrawn through line 6 is preferably subjected to a pre-treatment in pretreating zone 8 and then passed through line 9 into a mixing zone 10. The residual fraction withdrawn through line 7 may be passed directly to the mixing zone through line 11 if it is relatively paraffinic or if asphaltic may be passed through line 12 to a deasphalting zone 13 before being introduced into the mixing zone. Mixing zone 10 is provided with a suitable means of agitation and heating coils, jacketing or other means are provided for maintaining the temperature within the mixing zone at the desired level. Dilute aqueous hydrochloric acid having a concentration between about 3% and about 37% is introduced into mixing zone 10 from acid storage zone 14 through line 15 and the oil and acid are thoroughly mixed. The contact time within mixing zone 10 may vary from a few seconds to several minutes or longer and is not critical. As mentioned heretofore, the acid does not react with the oil to form a sludge but merely serves as a coagulating agent for the contaminants.

After the oil and acid have been thoroughly mixed in mixing zone 10, the mixture is passed through line 16 into a separation zone 17. The separation zone may constitute a settling tank, a centrifuge, a pressure type filter or similar equipment. The use of a centrifuge as a means of separating the oil, acid and contaminants is particularly effective when treating residual fractions because their high viscosity makes other separation methods unduly slow. Centrifugation also serves to break any emulsions which may be formed between the oil and the water. A stream of treated oil is withdrawn from the separation zone through line 18 and a stream of substantially uncontaminated hydrochloric acid is taken from the separation zone through line 19 and passed to acid storage 14. Make-up acid may be added to the acid storage zone through line 20. Metallic contaminants separated from the oil in the separation zone are withdrawn therefrom through line 21. The treated oil recovered from the separation zone through line 18 may be caustic and water washed in a washing zone 22 and withdrawn from the system through line 23. The caustic and water washing of the decontaminated oil is not an essential step of the process and may in some cases be omitted, particularly where the oil is to be catalytically cracked. It has been found that the presence of small amounts of dilute hydrochloric acid in the treated oil actually improved the yield of cracked products during a subsequent catalytic cracking operation.

The process thus described accomplishes the removal of nonvolatile metallic contaminants from heavy gas oils and from nonasphaltic residua. In order to demonstrate this removal, reference will be made to exemplary data illustrating the process.

In a first series of experiments, heavy gas oils containing various amounts of nonvolatile metallic contaminants were treated with 100 wt. percent of 37% aqueous hydrochloric acid at a temperature of 180° F. Each of the gas oils boiled in the range between about 950° F. and about 1300° F., although the exact boiling ranges varied slightly. The samples were first tested for metallic contaminants and then, after being treated with hydrochloric acid in the manner described above, were again analyzed to determined their contaminants content. The analyses were carried out by chemical colorimetric methods, by emission spectographic methods, and by X-ray fluorescence methods, the particular method employed depending upon the concentration of contaminants in a given sample and the volume of the sample which was available. The data obtained in these tests are summarized in the following table.

TABLE I

*Coagulation of Metals in Gas Oil*

[100 wt. percent of 37% aqueous HCl at 180° F.]

| Gas Oil | Nonvolatile Metals in Feed, p.p.m. | | Nonvolatile Metals in the HCl treated and Filtered Oil, p.p.m. | | Nonvolatile Metals Removed, Percent | | Metals in Spent Acid, p.p.m. | |
|---|---|---|---|---|---|---|---|---|
| | Ni | V | Ni | V | Ni | V | Ni | V |
| A | 1.5 | 4.1 | 0.3 | 0.7 | 80 | 83 | 0.08 | 0.03 |
| B | 1.0 | 2.7 | 0.4 | 0.7 | 60 | 74 | 0.08 | 0.09 |
| C | 2.1 | 11.8 | 1.0 | 2.5 | 48 | 79 | 0.16 | 0.33 |
| D | 2.5 | 34.2 | 0 | 18.2 | 100 | 47 | | |
| E | 1.0 | 2.9 | 0.4 | 0 | 60 | 100 | 0.2 | 0.0 |

The foregoing data show that substantially all the entrained nonvolatile contaminants found in heavy gas oils can be coagulated by treating the oil with aqueous hydrochloric acid. No acid sludge was formed and little emulsification of the oil and acid took place. Furthermore, the spent acid was essentially metal free, in contrast to such processes as those involving treating with concentrated sulfuric acid where an actual chemical reaction occurs. Similar experiments carried out using 5% nitric acid showed that about 80% of the nickel and about 72% of the vanadium were removed from the oil.

In a second series of experiments, gas oils containing essentially only volatile contaminants were treated in a manner similar to that employed in the tests reported in Table I. The data obtained show that the addition of aqueous hydrochloric acid to these samples had substantially no effect upon the metals content of the oil. It thus appears that dilute acids such as aqueous hydrochloric acid are highly effective for the coagulation of metals of the nonvolatile type but do not coagulate volatile metallic contaminants. The data obtained in this second series of experiments are summarized in Table II below.

TABLE II

*Aqueous HCl Treatment of Gas Oils Containing Volatile Metals*

[100 wt. percent aqueous HCl at 180° F.]

| Gas Oil | Acid Treat | Volatile Metals in Feed, p.p.m. | | Volatile Metals Removed, percent | |
|---|---|---|---|---|---|
| | | Ni | V | Ni | V |
| A | 3% HCl | 3.0 | 17.5 | 0 | 0 |
| A | 6% HCl | 3.0 | 17.5 | 3 | 0 |
| A | 37% HCl | 3.0 | 17.5 | 0 | 7 |
| B | 37% HCl | 2.3 | 0.1 | Nil | Nil |

It is a particular feature of the present invention to subject the petroleum fraction to be freed of metallic contaminants to a suitable pretreatment in order to convert the volatile contaminants to a nonvolatile form and thus permit their coagulation in accordance with the method of the invention. It has been found that the volatile contaminants present in high boiling gas oil and residual fractions may be readily converted to a nonvolatile form by heat soaking the oil so that the porphyrins polymerize. The heat soaking is preferably carried out at a temperature between about 300° F. and about 750° F. Higher temperatures may be employed but will normally decrease the yield of liquid product due to thermal cracking of the oil. The heat soaking may be continued over a period of from a few minutes to about 72 hours, depending upon the temperature employed and the particular properties of the fraction being treated. Heat soaking at about 600° to 700° F. for about 8 to 12 hours had been found to result in the conversion of substantially all of the volatile contaminants in most high boiling fractions without the formation of large quantities of coke and gas due to cracking, and is therefore preferred.

The heat soaking may be carried out by maintaining the oil in a closed agitated vessel or may instead be conducted on a continuous flow basis by passing the oil through a suitable bank of heaters or furnaces. The pressure during heat soaking is preferably maintained between about 50 p.s.i. and about 200 p.s.i., although considerably higher pressures up to about 3000 p.s.i. may be found advantageous under certain circumstances.

The effect of heat soaking upon the coagulation of metals by treatment with aqueous hydrochloric acid is shown by the data set forth in Table III below.

TABLE III

*Effect of Heat Soaking on Coagulation of Metals*

| Feed | Metals in Feed, p.p.m. | | Percent Removed by only Heat Soaking [1] | | Percent Removed by HCl Treating Only [2] | | Percent Removed by Heat Soaking and HCl Treating | |
|---|---|---|---|---|---|---|---|---|
| | Ni | V | Ni | V | Ni | V | Ni | V |
| Gas Oil A | 3.0 | 17.3 | 0 | 2 | 7 | 9 | 78 | 69 |
| Gas Oil B | 2.0 | 5.1 | 20 | 14 | 40 | 81 | 74 | 82 |
| Topped Asphaltic Crude | 55 | 430 | 47 | 56 | 11 | 10 | 87 | 90 |

[1] Heat soaking at 700° F. for 12 hours followed by filtration.
[2] Treatment with 100% by volume of 37% aqueous HCl followed by filtration.

It will be seen from the above table that the heat soaking of the oil considerably increased the amount of metallic contaminants which were removed by treating the oil with acid in accordance with the present invention. This increase was due primarily to the conversion of the volatile contaminants to the coagulable nonvolatile form but it is believed that in the case of the topped crude some improvement also occurred as a result of the effect of heat soaking upon the solutizing action of the asphaltenes present. The data show that some metals were removed by the heat soaking itself, probably by deposition upon coke particles which were formed. Except in the case of the topped crude oil, however, the amount of metals removed during the heat soaking step was relatively small in comparison with the total metals removed in the combined heat soaking-acid treating sequence. Such a heat soaking pretreatment is applicable to crude oil, gas oil and residual fractions.

The asphaltene-solutized, nonvolatile contaminants present in asphaltic crudes and residual fractions may also be converted to a coagulable nonvolatile form by a mild hydrotreating operation. Hydrotreating is well-known in the petroleum processing art and any of a number of hydrotreating processes may be employed for the purposes of the invention. All of these processes are similar, differing only slightly in the operating conditions and equipment employed. In a typical hydrotreating process, the feed is preheated to a temperature in the range of from about 500 to about 900° F. and then introduced with excess hydrogen into a reactor containing a hydrogenation catalyst such as molybdena or cobalt molybdate on an alumina carrier. The pressure in the reactor is preferably maintained between about 200 and about 800 p.s.i.g. The use of a cobalt molybdate catalyst and temperatures and pressure conditions of about 200 to 400 p.s.i.g. and about 500 to 700° F. are particularly preferred for purposes of this invention. Feed rates of from about 1 to 5 volumes per hour per volume of catalyst may be employed and from about 1000 to about 4000 s.c.f. of hydrogen may be introduced per barrel of feed. A fluidized catalyst system may be used to permit regeneration of the catalyst or in lieu thereof parallel reactors may be used. It has been found that catalyst regeneration is necessary when hydrotreating the heavy oils with which this invention is concerned, even though most hydrotreating processes can be carried out without regeneration. The catalyst may be regenerated continuously or periodically by burning in the presence of air or other oxygen containing gases. The hydrotreated oil withdrawn from the reactor is cooled and passed to a gas separation zone wherein the hydrogen containing gases are separated from the oil and recycled to the reactor for reuse. The oil may subsequently be stripped to remove hydrogen sulfide contained therein.

The use of hydrotreating as a method for overcoming the metal solutizing effect of asphaltenes preparatory to acid treating in accordance with the invention is advantageous in that such hydrotreating simultaneously reduces the sulphur content of the oil and improves the oil stability. Both sulphur content and stability are important in catalytic cracking feeding stocks and in residual fuels. Prior hydrotreating significantly increases the yield of gasoline obtained during subsequent catalytic cracking and decreases the production of coke and gas. Cracked products from such hydrotreated stocks are lower in sulphur, have high octane numbers, and require less treating than do similar products from a virgin feed stock. The use of hydrotreating as a preliminary treatment prior to metals removal by hydrochloric acid coagulation is therefore preferred.

The effect of hydrotreating upon metals coagulated is shown in Table IV below. Two samples of a topped crude oil were analyzed for metals content before and after treatment with hydrochloric acid and filtration to remove coagulated metals. One of these crudes had been hydrotreated and the other was a virgin crude. The boiling ranges of the two were essentially the same but there was a very slight difference in the original metals contents of the fractions. The data in Table IV show that none of the contaminants from the virgin crude oil were removed by treatment with dilute hydrochloric acid. This was probably due to the presence of a high concentration of asphaltenes which tended to solutize most of the contaminants (nonvolatile) which were present in the oil. Most of both the nickel and vanadium were removed from the hydrotreated oil upon subsequent contacting with hydrochloric acid and filtration. It is believed that the hydrotreating destroyed the solutizing effect of the asphaltenes and also effected the polymerization of some of the volatile type metallic compounds present as a minor part of the contaminants. As in the case of heat soaking, the hydrotreating itself effected the removal of a small amount of the contaminants but this amount was not sufficient to permit the use of the oil as a catalytic cracking feed stock or as a high grade residual fuel.

TABLE IV

*Effect of Hydrotreating on Metals Coagulation*

| Feed | Metals in Feed, p.p.m. | | Metals in oil after HCl treating, p.p.m. | | Percent Metals Removed | |
|---|---|---|---|---|---|---|
| | Ni | V | Ni | V | Ni | V |
| Virgin Crude | 53 | 405 | 55 | 402 | 0 | 0 |
| Hydrotreated Crude [1] | 31 | 154 | 2.5 | 20 | 92 | 87 |

[1] Sample before hydrotreating contained 45 p.p.m. Ni and 360 p.p.m. V.

It has been pointed out heretofore that the asphaltenes present in asphaltic residua exert a solutizing effect upon the metallic contaminants present in such residua and prevent their coagulation by aqueous hydrochloric acid. This solutizing effect may be overcome by the deasphalting of the oil prior to acid treatment for the removal of metallic contaminants. This is clearly demonstrated by the data in Table V which were obtained by treating asphaltic residua and a similar deasphalted residum with aqueous hydrochloric acid in accordance with the invention. The acid treatment removed at most about ⅓ of the metals from the untreated residua, while substantially complete removal was achieved in the case of the deasphalted stock. The data in Table V also show the effect of acid concentration. The use of 37% acid caused the precipitation of an acid sludge from the asphaltic residua while concentrations of 18% and lower had no such effect. Sludge formation obviously causes a considerable reduction in the yield of oil obtained. A slight advantage was shown for the acid having a concentration of about 9% with Stock A.

TABLE V

*Coagulation of Metals in Asphaltic Residua*

[100 wt. percent aqueous HCl at 180° F.]

| Residuum | Acid Treat | Feed Metals, p.p.m. | | Percent Removal | |
|---|---|---|---|---|---|
| | | Ni | V | Ni | V |
| A | 4½% HCl | 96 | 437 | 18 | 19 |
| A | 9% HCl | 96 | 437 | 35 | 30 |
| A | 18% HCl | 96 | 437 | 30 | 26 |
| A | 37% HCl | 96 | 437 | ([1]) | ([1]) |
| B (Deasphalted) | 8% HCl | 1.2 | 5.5 | 100 | 82 |

[1] An acid sludge was formed.

As shown in the foregoing data, the metallic contaminants present in asphaltic residua do not fully respond to treatment with dilute hydrochloric acid because of the solutizing effect of asphaltenes in the residua. This can be overcome by a deasphalting step wherein the asphaltenes are removed. The deasphalting may be carried out using any of a number of well-known methods. A preferred deasphalting process involves countercurrent contacting of the residua with a light hydrocarbon solvent such as propane or a mixture of propane and butane. A higher boiling aromatic wash oil such as the heavy bottoms fraction from a catalytic fractionator is used in the process. The residua and the wash oil are introduced into the upper portion of a deasphalting tower and flow downwardly countercurrent to a rising stream of solvent introduced into the lower portion of the tower. About 20 volume percent of the wash oil, based on the residual feed, is normally used. The oily constituents of the residua are dissolved in the solvent and are carried overhead from the deasphalting tower through a heat exchanger to a stripping tower where solvent is removed. The resulting product is deasphalted oil. The bottoms stream from the deasphalting tower consists essentially of wash oil, asphaltenes and small quantities of solvent. This fraction is heated and then passed through a stripper where the solvent is flashed off. Asphaltenes are withdrawn from the bottom of the stripping tower. These may contain a considerable fraction of the original metals in the feed, depending upon the deasphalted oil yields chosen. The deasphalted oil thus obtained may then be treated with acid for the removal of the remaining metallic contaminants as described heretofore.

Although the solutizing effect of the asphaltenes present in asphaltic residua may be overcome by deasplating the oil as described above, such a deasphalting procedure is disadvantageous in that the yield of deasphalted oil is relatively low. Yields of from 40 to 50% are not uncommon in such processes. It has been found that this disadvantage can be overcome by recombining the asphaltenes and the deasphalted oil following the deasphalting step and then treating the combined fraction in order to coagulated metallic contaminants. It has been found that the solutizing effect of the asphaltenes is in some way irreversibly destroyed during the deasphalting step and is no longer in evidence when the asphaltenes and deasphalted oil are recombined. The metallic contaminants present in such a combined fraction can thus be readily coagulated without the difficulties encountered with untreated asphaltic fractions. Recombining of the asphaltenes in the oil markedly reduces the yield losses which are otherwise incurred. The amount of metals removal which takes place may be as good as that which is obtained with the deasphalted oil.

The wash oil used to decrease the viscosity of the asphaltic residua during the deasphalting step may be a heavy gas oil which contains substantial quantities of the metallic contaminants. The gas oil after deasphalting is combined with the residua and the metallic contaminants in both fractions are subsequently removed by acid treating. This procedure avoids the use of metals free fractions as a wash oil and permits the gas oil and residuum to be treated simultaneously. The gas oil may, of course, be subjected to suitable pretreatment such as heat soaking or hydrotreating prior to being used as wash oil in the deasphalting step of the process.

Although the process of the invention has been described primarily in terms of treating with the preferred coagulant, dilute aqueous hydrochloric acid, as pointed out heretofore other dilute acid solutions of mineral acids having appreciable solubility in oil, such as nitric acid, may also be employed, provided that the acid concentration is maintained at a suitable level to prevent formation of a sludge due to chemical reactions between the acid and the oil.

It will be understood that many modifications may be made in the process described above without departing from the scope of the invention. Such modifications will be readily apparent to those well versed in the art. It is intended that the invention be limited only by the scope of the following claims.

What is claimed is:

1. A process for selectively removing iron, nickel and vanadium porphyrins from an asphaltic petroleum oil boiling above about 950° F. which comprises deasphalting said oil; contacting said deasphalted oil with aqueous hydrochloric acid having a concentration between about 3% and about 37% to coagulate metallic porphyrins present in said oil; and thereafter separating said oil, said acid and said coagulated porphyrins.

2. A process for the selective removal of metallic contaminants from an asphaltic petroleum oil including constituents boiling above 950° F. which comprises segregating two oil fractions from an asphaltic petroleum crude oil, the first oil fraction boiling in the range between about 950° F. and about 1300° F. and the second oil fraction comprising residual oil boiling above about 1300° F., pretreating said first oil fraction at a temperature in the range of about 300° F. to about 900° F. for a sufficient time to convert metallic contaminants therein to a colloidal form, deasphalting said second oil fraction, contacting said first oil fraction and said second oil fraction with aqueous hydrochloric acid having a concentration between about 3% and about 37% to coagulate the colloidal metallic contaminants present in said fractions and thereafter separating said oil fractions from said acid and coagulated metallic contaminants.

3. A process for selectively removing iron, nickel and vanadium porphyrins from an asphaltic petroleum oil boiling above about 950° F. which comprises deasphalting said oil; contacting said deasphalted oil with aqueous hydrochloric acid having a concentration between about 3% and about 37% to coagulate metallic porphyrins present in said oil; thereafter separating said oil, said acid and said coagulated porphyrins; and wherein in said process asphalt obtained in said deasphalting of said oil is combined with said deasphalted oil prior to the contacting thereof with said acid.

4. A process for selectively removing metal contaminants from an asphaltic petroleum oil containing constituents boiling above about 950° F. which comprises in combination deasphalting said oil, contacting said deasphalted oil with an aqueous solution of hydrochloric acid to coagulate said metal contaminants in said oil, separating said oil, said acid and said coagulated contaminants, recovering a treated oil of reduced metals content and wherein in said process asphalt obtained in said deasphalting of said oil is combined with said deasphalted oil prior to contacting thereof with said acid.

References Cited in the file of this patent

UNITED STATES PATENTS

| | | |
|---|---|---|
| 127,446 | Young | June 4, 1872 |
| 1,411,237 | Day | Mar. 28, 1922 |
| 1,513,133 | Rowland | Oct. 28, 1924 |
| 1,660,295 | Goodwin | Feb. 21, 1928 |
| 1,865,001 | Goodwin | June 28, 1932 |
| 2,002,004 | Gard | May 21, 1935 |
| 2,009,710 | Goodwin | July 30, 1935 |
| 2,081,473 | Bray | May 25, 1937 |
| 2,611,735 | Coons | Sept. 23, 1952 |
| 2,685,561 | Whiteley et al. | Aug. 3, 1954 |
| 2,717,855 | Nicholson | Sept. 13, 1955 |
| 2,729,593 | Garwood | Jan. 3, 1956 |
| 2,846,358 | Bieber et al. | Aug. 5, 1958 |